Figure 1:
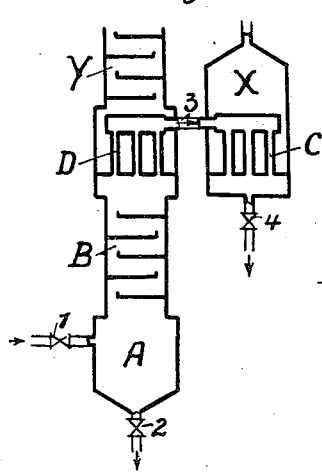

March 3, 1942.  M. SEIDEL  2,274,748

METHOD FOR OBTAINING DISSOLVED VOLATILE SUBSTANCES FROM SOLUTIONS

Filed Feb. 17, 1938  2 Sheets-Sheet 1

Inventor:
Max Seidel
Wm. S. Pritchard.
Attorney.

March 3, 1942. M. SEIDEL 2,274,748
METHOD FOR OBTAINING DISSOLVED VOLATILE SUBSTANCES FROM SOLUTIONS
Filed Feb. 17, 1938 2 Sheets-Sheet 2
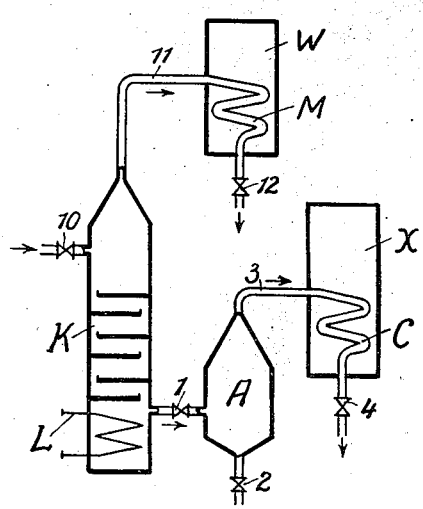
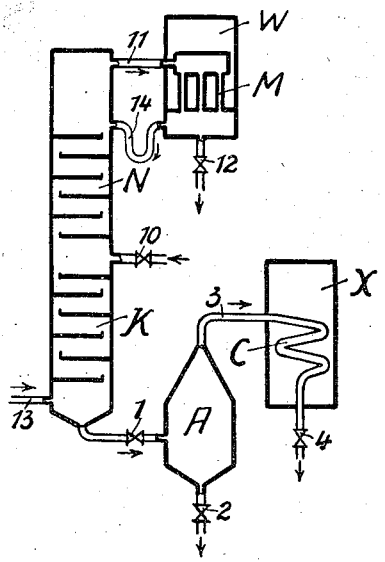
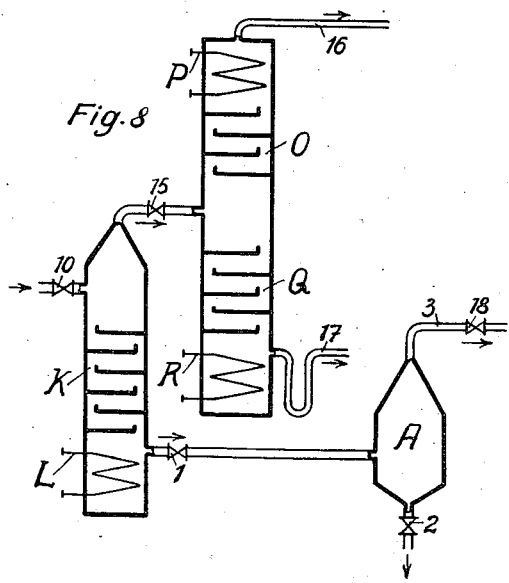
Inventor:
Max Seidel
WM. S. Pritchard.
Attorney.

Patented Mar. 3, 1942

2,274,748

UNITED STATES PATENT OFFICE 2,274,748

METHOD FOR OBTAINING DISSOLVED VOLATILE SUBSTANCES FROM SOLUTIONS

Max Seidel, Solln, near Munich, Germany

Application February 17, 1938, Serial No. 190,979
In Germany April 3, 1936

12 Claims. (Cl. 202—39)

This invention relates to a method for obtaining or separating dissolved volatile substances from boiling or hot solvents.

In a number of chemical processes, boiling or nearly boiling liquids that are under pressure and contain volatile substances are relieved of pressure more or less when leaving the apparatus. In such processes, part of the dissolved volatile substances passes over into the vapors generated when the pressure is reduced, the balance of the volatile substances remaining dissolved in the liquid in accordance with the prevailing conditions of equilibrium. As illustrative examples of this may be mentioned sulphite waste liquors that are drawn from pulp cookers, and wood sugar worts produced with dilute acid which come from the reaction vessels. If fermentation is intended, certain volatile substances in these liquids are harmful on account of their anti-fermentative properties, such substances being, for example, sulphurous acid, acetic acid, formic acid, furfurol, aldehydes, etc. Considerable economic advantages are gained by obtaining or removing such substances by simple means and without any important additional costs, as the volatile substances that are yielded may either be used again with advantage in the same process (sulphurous acid in the cooking of sulphite pulp) or represent a by-product that can find good use (furfurol in wood saccharification, especially where wood rich in pentoses, for example, beech, is saccharified). Separation with or without the yielding of the volatile substances was not possible with the hitherto known and employed methods, if it were sought to make simultaneously extensive profitable use of the available heat.

When the liquors or worts are withdrawn from the reaction vessels, the pressures on the liquids are reduced, as such high pressures and temperatures are not needed in the subsequent treatment. As a result of this reduction of pressure, vapors arise which for reasons of heat economy should be made use of in the same or in another process that is carried on simultaneously.

In many cases the value of the dissolved volatile substances makes it advantageous to obtain them, unless the expense occurred thereby is too high. Even with respect to the properties of the expanded liquid itself or with respect to the vapors arising at the reduction of the pressure or their condensate, it may be advantageous to separate the volatile substances from the liquid or from the vapors arising at the reduction of the pressure, or from both. However, the amount of the dissolved volatile substances, which is often slight, frequently makes it difficult to separate them when employing the usual methods, so that the costs of separation would sometimes exceed the value of the volatile substances obtained or the increased value of the solvent freed therefrom.

The vapors generated when the pressure on the boiling solvent is reduced are to be employed for economic reasons mostly for heating devices or apparatus, for example, evaporators, distilling vessels, rectifying columns, etc. Before precipitating the vapors for heating purposes, the separation of the dissolved volatile substances in a special process is seldom applicable, because otherwise the amount of heat available for heating purposes would be greatly diminished. An exception is the comparatively rare possibility of absorption, extraction or chemical combining with a means permitting an inexpensive recovery or separation of the combined volatile substances and which means is thus itself released for combining with additional quantities of the dissolved volatile substance, or the combination with a means that either can be made use of, together with the combined substance, or is available at a very low price.

The fundamental idea of the present invention is to obtain or separate the volatile substances, before precipitating, for purposes of heating the vapors generated by the reduction of pressure, by means of rectification at so high a pressure that the heating effect of the condensing vapors is maintained.

One embodiment of applying the new process consists in heating a series-connected-apparatus by the condensing readily boiling substance which leaves the top of a condensing rectification column serving to separate it from the vapors of the solvent. The working pressure of this column is so chosen that the vapors of the readily boiling substance condense at the temperature required for the heating of the succeeding apparatus. The vapors arising when the pressure on the solvent is reduced can be split up immediately in such a condensing rectification column.

In order to obtain or separate the volatile substances still dissolved in the liquid solvent after reducing the pressure, vapors of the solvent are made, according to the invention, to flow counter-currently in a driving-off rectification column, which more or less perfectly take up the rest of the content of volatile substances of the liquid. The working pressure of the column is again chosen with respect to the employment of the readily boiling vapors for heating purposes. Driving off in a rectification column the volatile substances still contained in the expanded liquid after pressure has been reduced, offers the advantage that a minimum amount of vaporous solvent is required to take up the volatile substances. This amount of vapor may be concentrated to the state of equilibrium with the content of the liquid of volatile substances. The volatile substances are thus obtained in a concentration that is advantageously high for subsequent processing.

The vapors with the volatile substances driven out after the reduction of pressure are fed, together with the vapors generated at the reduction of pressure, or separately, to the concentration rectification columns serving to separate the volatile substances, the readily boiling substance being precipitated for heating purposes.

If more vapor is needed for heating purposes than is generated when the pressure on the solvent is reduced, the additional heating vapor that has to be employed may first be used for driving out the residual volatile substances from the expanded liquid. The needed additional heat is then obtained from the solvent vapors that have been enriched with volatile substances in the driving-off and the concentrating rectification column. Therefore, the additional production or separation of the volatile substances still present in the liquid after the reduction of pressure requires almost no additional expense in this case. The pressure of the additional vapors need be only a little higher than when employed immediately for heating, namely so high that the readily boiling part passing into the concentrating rectification column has the temperature required for heating. The readily boiling part consists of the more or less pure separated volatile substances, and may also contain large amounts of the solvent, especially if the volatile substances form with the solvent a mixture having a minimum boiling point.

Should the readily boiling vapors of the concentrating rectification column not be suitable for certain heating purposes on account of their properties or, if, for example, apparatus have to be heated by the direct injection of vapors of a certain kind, the required vapors may be suitably produced at the head of the condensing rectification column by the latter's condensing readily boiling part and be fed thence to the apparatus to be heated.

The new process is particularly advantageous in cases where the boiling point of the dissolved volatile substances or of its minimum boiling point mixture with the solvent is only a little below that of the solvent or the vapors generated by the pressure of the mixture being reduced, for example, furfurol in aqueous solution, the minimum boiling point of which is only a little below the boiling point of water. Where the boiling points show a greater difference, the advantages may be retained if a mixture is separated in the concentrating rectification column in which the volatile substances are not contained in the greatest purity attainable, but are concentrated only to such a degree that the boiling points of the readily boiling part and the original mixture show a difference which requires no great increase of pressure. Such a mixture may either be usable directly in the dilute composition that is obtained or may be drawn off, or it may yet be purified by a special process. Finally, if the production or separation of the dissolved volatile substances in a dilute form suffices, such as corresponds to the content of volatile substances of vapors generated when the pressure is reduced, or to the approximately equally great content of the vapors enriched in a driving-off rectification column with the volatile substances of the expanded liquid, both kind of vapors may be precipitated for heating purposes, together or separately, without any further separation in a concentrating rectification column. The condensate, with its content of volatile substances which is small, but in many cases sufficient to meet the requirements, is either used immediately or drawn off and subjected to further treatment. The case mentioned last is met with mostly if the volatile substances are separated only in order to purify a solvent which is cheap in itself, for example, water, or if the volatile substances may be used in such slight or in a still greater dilution than that in which they are contained in the vapors arising when pressure is reduced, as is the case with sulphurous acid in the cooking of sulphite pulp.

If the boiling point of the dissolved volatile substances is substantially below the boiling point of the solvent and the production or separation of the volatile substances in a comparatively greatly diluted solution is not expedient, heating by the precipitation of the readily boiling constituent of the solvent vapors enriched by volatile substances which pass over in a concentrating rectification column becomes uneconomical or impossible. With great differences of temperature of the boiling points there are also great differences of the content of volatile constituents in liquid and vapor, and this is also the reason that, when the vapors are saturated with the volatile substances, smaller quantities of vapors are in most cases required for taking up the volatile substances dissolved in the liquid than those that arise when the pressure of the liquid solvent is reduced. In this connection it must be taken into consideration that the degree in reduction of pressure is mostly determined by other factors than the absorption of the volatile substances by the vapors generated when pressure is reduced. In most cases pressure is reduced to such an extent that the vapors generated exhibit exactly the temperature required for the given heating purposes.

In order to insure in these cases also the utilization for heating purposes of the vapors generated when pressure is reduced, without being obliged to renounce the production or separation of the dissolved volatile substances, the volatile substances dissolved in the liquid solvent may also be driven off according to the invention before reducing the pressure of the solvent at a pressure obtaining at the preceding process or at a pressure a little below this. In special cases the driving-out of the volatile substances may be effected by passing the solvent vapors through the reaction chamber of the apparatus that is under pressure, thus making a special driving-off rectification column unnecessary.

The small amounts of the vaporous solvent required for driving-out the volatile substances may be fed to a concentrating rectification column after having been enriched with volatile substances in a driving-off rectification column working at a pressure below that obtaining before the proper pressure reduction of the solvent. The readily boiling constituent separated in this concentrating rectification column may either be condensed, suitably at the head of this column, for heating purposes requiring correspondingly low temperatures or, if the condensation point of the readily boiling constituent that passes over is particularly low, the head condenser of the condensing rectification column may be cooled with water or another cooling agent.

The result of the application of this rectification process at as high a pressure as possible is that the heating effect that may be obtained is increased to a great extent in consequence of the higher condensation temperature of the readily boiling constituent connected with the higher pressure. At a fixed heating temperature, the high pressure makes attainable the greatest possible purity of the readily boiling product with great differences of the boiling points of volatile substance and solvent. With substances having a very low condensation point, the highest pressure possible also makes attainable at a given temperature of the cooling water a greater purity of the readily boiling product. Should the available temperature of the cooling water not be sufficient for obtaining a readily boiling product that is pure or exhibits a certain purity, a slightly impure intermediate product, greatly enriched by the volatile substances, may be separated also instead of using other methods of cooling.

If it appears to be of advantage, for example, on account of the conditions of equilibrium, the volatile substances may be concentrated also at a low pressure of any height independently of the pressure obtaining in the driving-off rectification column.

The vapors, freed more or less extensively of solvent, which are produced from the volatile substances when the pressure is reduced, having like the liquid solvent no inadmissible content of volatile substances, may be used for heating purposes in the usual manner without employing special means, or they may also be precipitated to produce heating vapors of a definite kind.

In all the possible embodiments of the new process, the production or separation of only part of the dissolved volatile substances may also be sufficient in accordance with the requirements.

In the accompanying drawings forming a part of this specification and wherein like reference characters designate like parts, Figures 1–8 inclusive diagrammatically show several illustrative embodiments of the invention. It is to be understood that the invention is not restricted to the specific embodiments, compositions and apparatus shown, since it is obvious that there are many other embodiments, compositions and apparatus to which the principles of this invention may be applied.

Figure 1 diagrammatically illustrates an embodiment of the invention wherein volatile substances present in the vapors generated when the pressure of the solvent is reduced are simultaneously concentrated and used for heating purposes. This embodiment will be described for illustrative purposes in connection with obtaining furfurol or other volatile substances, e. g. oils of turpentine from wood sugar wort, such as is produced in the Scholler percolation process.

According to this embodiment, hot wood sugar wort, such as comes from the reaction vessel where the saccharification has taken place, under a pressure of, for example, 4 to 15 atmospheres and at a temperature of 140° to 170° C., is passed through a preferably automatic-acting, pressure-reducing throttle member 1 into the separating vessel A. In passing through the throttle member or valve 1, the pressure on the wort is decreased to 3 atmospheres. Upon entering the separation chamber A, the liquid separates from the vapors resulting from the reduction in pressure and is withdrawn with a further reduction in pressure through the regulating member 2, which may be a pressure-reducing valve which functions automatically. The generation of steam during the reduction of pressure in the throttle member 1 is due to the heat liberated by the liquid being cooled to the saturated steam temperature of 133° C. corresponding to the pressure of 3 atmospheres.

A heat-exchange apparatus, if desired, may be inserted between the separating vessel A and the regulating valve 2, which apparatus receives the sensible heat of the wood sugar wort discharged through the regulating valve 2.

The vapors which are generated in the valve 1 when the pressure is reduced to 3 atmospheres, and which contain volatile substances, ascend from the separating chamber A and pass into the concentrating rectification column B, there enriched with volatile substances, for example, furfurol, or oils of turpentine, and the like supplied in a reflux liquid as hereafter explained. The rectification column B is provided with a baffle, as shown, so as to give the ascending vapors a spiral path of travel.

In the rectification column B there is provided a heater D which is adapted to heat an apparatus Y. The heater D may serve as a condenser of the apparatus Y, which may be a distilling column for obtaining alcohol or an evaporator in which vapors are produced from water for operating or heating apparatus, e. g. rectifying columns. The vapors, after passing through the rectification column B, pass to the heater D and there is a heat exchange between said heater D and the vapors. As a consequence, a portion of the readily boiling vapors is precipitated or condensed, the precipitate or condensate serving the column B as reflux liquid. The residual readily boiling vapors enriched with the liquid substances, for example, furfurol, pass through the duct 3 to the heater C of the apparatus X that is to be heated. The apparatus X, for example, may be a rectifying column or a heater of an evaporator. There is a heat exchange between the heater C and the vapors, the latter being liquefied, after which the liquid is discharged through an outlet controlled by the regulating member 4. Before the liquid is discharged through the regulating member 4, it may be cooled to prevent a subsequent evaporation during the discharge.

Figure 2:
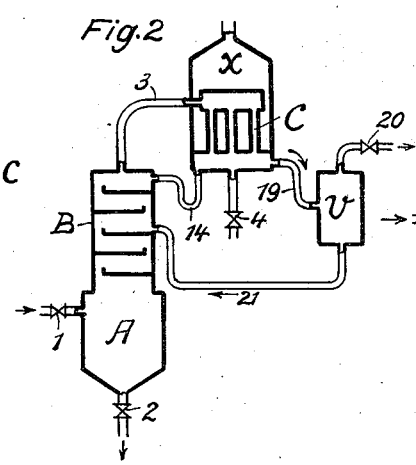

Instead of employing the two heaters C and D, which serve as condensers for the readily boiling substances, only one of them may be used. As shown in Figure 2, the heater D may be eliminated and the entire readily boiling vapors being precipitated in the condenser C. In the embodiment, the amount of readily boiling condensate not discharged through the outlet may be supplied to the concentrating rectifying column B through the line controlled by the valve 4.

It is not possible to obtain pure furfurol directly in the concentrating column B, since the furfurol forms a minimum boiling point mixture with the water of the vapors of the distillate. If a further concentration of the volatile substance is desired, due to the slight solubility of furfurol in water, this may be achieved by separating the condensate into two layers. An illustrative procedure and apparatus for securing this is shown in Figure 2. In order to separate the condensate into two layers, the condensate, instead of being withdrawn through the line controlled by the valve 4, is fed through the line 19 into a separation vessel V where a layer rich in furfurol and a layer poor in furfurol is formed by stratification. For example, if the condensate in the condenser C contains more than 18% of furfurol, there is formed in the vessel V a layer containing about 80% of furfurol, from which there is removed through the line 20 a portion equivalent to the amount of furfurol produced. The poorer layer containing about 18% of furfurol constitutes a reflux liquid and is fed through the line 21 to the concentrating rectifying column B, preferably at some suitable point at which there is present in the column a composition similar to the reflux liquid.

The process may also be employed for other volatile substances and solvents which are discharged from containers or reaction vessels under pressure at a temperature which permits the use for heating purposes of vapors generated during a reduction of pressure on account of the steam pressure obtaining at this temperature. Further, instead of the embodiments shown in Figures 1 and 2, those shown in Figures 3 to 8 may be used.

Figure 3:
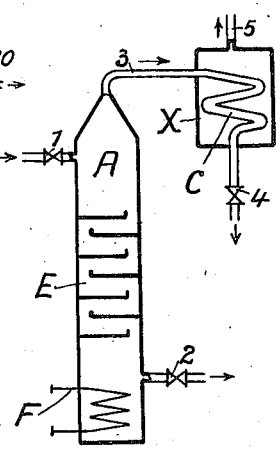

Referring now to Figure 3, there is shown an embodiment of the invention wherein volatile substances which are still present in the liquid solvent after the reduction of pressure are expelled and the simultaneous use for heating purposes of the vapors generated by the reduction of pressure and of the vapors made use of for the expulsion of the volatile substances. In this manner undesirable substances in a liquid may be removed and cooled if desired. For example, furfurol, a substance checking fermentation, may be removed from wood sugar worts, or sulphurous acid may be removed from waste sulphite liquors used in the cooking of pulp. Hereafter is set forth an embodiment of the invention relating to removal of sulphurous acid from waste sulphite liquors.

Sulphite waste liquor coming from the pulp cookers under, for example, a pressure of from 4 to 6.5 atmospheres and at a temperature of about 140°-160° C., passes through the pressure-reducing valve 1 with a reduction of pressure, for example, to 2 atmospheres into the separating chamber A and in so doing cools down by partial evaporation to the corresponding saturated steam temperature of 120° C. In the separating chamber A, the liquid separates from the steam and flows down, under a pressure of 2 atmospheres, through the driving-off rectifying column E, giving off the volatile substance contained in it to the vapors rising in the column, and is finally discharged through an outlet controlled by the valve 2. The rectifying vapors for the column E are produced from the sulphite waste liquor which flowed down through the column E by means of a heating coil F appropriately placed, such as adjacent the valve 2, as shown. The vapors of the column E, together with the vapors generated during the reduction of pressure in the valve 1 and separated in the chamber A, pass through the line 3 to the condensing coil C of the apparatus X, and leave the latter in a liquefied state through the line controlled by the valve 4 to be made use of for the preparation of new sulphite liquor for subsequent cookings of pulp. In the apparatus X, vapors are generated from a liquid and pass through the line 5 to apparatus desired to be heated and for which heating the vapors precipitated in coil C are not suitable.

Figure 4:
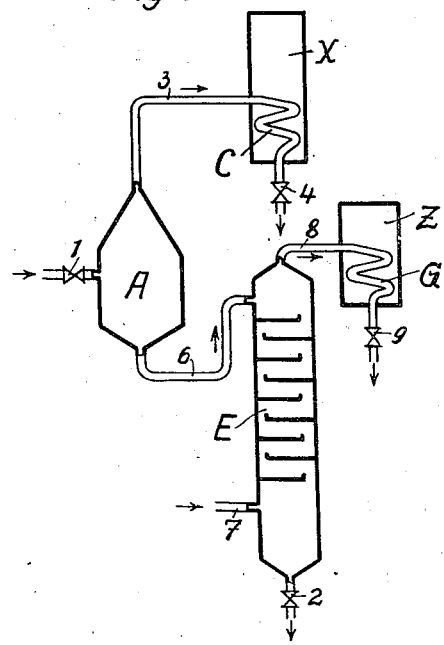

The embodiment shown in Figure 4 differs from that shown in Figure 3 in that there is separate precipitation of the vapors from the rectification column E and the vapors generated when the pressure is reduced.

Now referring to Figure 4, waste sulphite liquor coming from the pulp cookers and under, for example, a pressure of from 4 to 6.5 atmospheres and at a temperature of 140°-160° C., passes through the pressure-reducing valve 1 with a reduction of pressure to, for example, 2 atmospheres into the separating chamber A, and in so doing is cooled by partial evaporation to the corresponding saturated steam temperature of 120° C. The sulphite liquor, freed in the separating chamber A from the sulphurous acid vapors generated during the reduction of pressure in the valve 1, passes through a syphon pipe 6, under the pressure of 2 atmospheres obtaining in the separating chamber A and at a corresponding temperature of 120° C., into the driving-off rectifying column E. The rectification vapors for the column E are injected directly at 7.

The vapors, generated by the reduction of pressure in the valve 1, pass from the separation vessel A through the line 3 to the heater C of the apparatus X to be heated, which apparatus may be of any kind. The vapors are liquefied in the heater C and pass therefrom through the outlet controlled by the regulating member 4. The vapors blown into the column E at 7, which are enriched with sulphurous acid, pass through the line 8 to the heater G of an apparatus Z to be heated, and finally leave said heater G in a liquefied state through an outlet controlled by the valve 9. The sulphite waste liquor freed more or less perfectly from the sulphurous acid contained therein is discharged through the line controlled by the valve 2.

Figure 5:
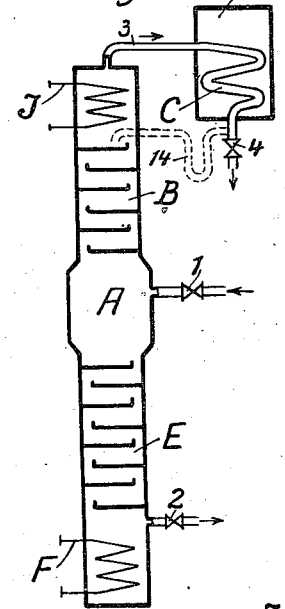

The embodiment shown by way of example and diagrammatically in Figure 5 permits the expulsion of the volatile substances out of the released liquid in a single passage and concentrates them to the desired content. This embodiment will be described in connection with the use of the media refered to in Figures 1 and 2.

Now referring to Figure 5, a wood sugar wort under a pressure of 4 to 15 atmospheres and at a temperature of 140-170° C. is introduced into the separation chamber A through the pressure-reducing valve 1, as described in connection with that embodiment of the invention relating to Figures 1 and 2. The valve 1 reduces the pressure to approximately 3 atmospheres and the temperature drops, through loss of heat obtained by evaporation of a partial amount of the liquid, automatically to the saturated steam temperature of 133° C. corresponding to it. Under these conditions (pressure of 3 atmospheres and temperature of 133° C.) obtaining in the separation chamber A, the liquid, which has not been evaporated, flows downwardly into the driving-off rectification column E, which communicates with the separation chamber A, and is disposed preferably beneath said separation chamber as shown in Figure 5. The vapors of rectification for the column E are produced at the foot thereof by the heating coil F acting on the wood sugar wort which collects adjacent thereto. If desired, the rectification vapors may be introduced directly as described in connection with Figure 4.

The wood sugar wort freed from the volatile substances, such as furfurol, turpentines, etc., is discharged through the oulet controlled by the regulating member 2 which, in turn, may be controlled, for example, by a float or other control device which depends on the level of the liquid.

The vapors from the driving-off rectifying column E, which have taken up more or less completely the volatile substances from the wood sugar wort running off at 2, combine in the separating vessel A with the vapors generated during the reduction of pressure to 3 atmospheres and ascend together with these through the concentrating rectification column B, where they are further enriched by a reflux which is a condensate produced by means of the cooling coil I. The thus enriched vapors pass through the line 3 to the condenser coil C, which is, at the same time, a heater for the apparatus X which is to be heated. The condensed readily boiling substances are removed from the coil C by the outlet controlled by the valve 4.

In the cooling coil I, liquids may be heated or steam generated for other suitable heating purposes.

If desired, the cooling coil I may be omitted and the reflux liquid may be produced in the condenser C together with the condensate. In this embodiment, reflux liquid is fed to the column B from the coil C by means of the line 14.

If little reflux liquid is needed for column B, the heating action may be neglected in the precipitation of the vapors for the formation of the reflux liquid of the concentrating rectification column, as in the example shown, and water may be used for cooling at this point. In other cases where much reflux liquid is needed for the concentrating rectification column and correspondingly little readily boiling product is obtained, the liquefaction of the reflux may be effected for heating purposes and the small amount of the readily boiling product may be precipitated by means of water cooling.

Figure 6 shows an arrangement for driving off the volatile substances before the reduction of pressure, with a simultaneous utilization for heating purposes of the vapors generated when pressure is reduced. This arrangement is particularly applicable to volatile substances or readily boiling products of decomposition (for example, also minimum boiling point mixtures) with a boiling temperature that is too low to give a heating effect, as for example, sulphurous acid in the waste sulphite liquors, unless a mode of separation without concentration, as in Figure 2, is chosen for these substances.

A hot solvent, for example, waste sulphite liquor from pulp cookers and under a pressure of 5 atmospheres and at a temperature of 151° C., is introduced through an inlet controlled by the regulating member 10 into a driving-off rectification column K. The waste sulphite liquor on flowing down through the column K gives off volatile substances, for example, sulphurous acid, to the rising vapors. The waste sulphite liquor freed from volatile substances is conducted from the column K by a line disposed in the vicinity of the bottom of said column K and introduced through the pressure-reducing throttle member 1 into the separator A where it separates from the volatile substances, such as sulphurous acid and free vapors arising when pressure is diminished, and passes therefrom through the outlet controlled by the regulation member 2. The rectification vapors for column K are produced by means of the heating coil L, preferably disposed adjacent the discharge outlet or introduced directly from the outside as in Figure 7 as hereafter described. The vapors enriched by volatile substances from column K pass through a pipe 11 to a heating coil M of the evaporator W and are discharged in the liquefied state through an outlet controlled by the regulating member 12. The liquid from the separator A is withdrawn or discharged through the line controlled by the valve 2. The vapor arising in the separator A is conducted through the line 3 to the coil C, which is a heater for the apparatus X. In the coil C the vapors are precipitated and discharged therefrom through the line controlled by the valve 4.

The arrangement shown in Figure 7 differs from Figure 6 by additionally concentrating the vapors enriched by volatile substances.

Referring now to Figure 7, a hot solvent, for example, waste sulphite liquor, as it comes from pulp cookers, passes through the inlet controlled by the regulating member 10 into a driving-off rectification column K. The waste sulphite liquor as it flows down the rectification column K gives off volatile substances, for example, sulphurous acid, to the vapors ascending said column K. The hot waste sulphite liquor is fed from said column K by a line preferably disposed in the vicinity of the bottom of said column K and fed through the pressure-reducing throttle member 1 into the separator A, where it, the liquid, separates from the vapors produced by the reduction in pressure and passes therefrom through the outlet controlled by the regulation member 2. The vapors resulting from the reduction in pressure in the separation chamber A pass through the line 3 into the coil C of the evaporator X and are then discharged in a liquefied form through the outlet controlled by the regulating member 4 in the same manner as described in connection with Figure 4. Adjacent the bottom or the discharge outlet of the driving-off rectification column K, rectification vapors are injected directly, as, for example, through the inlet 13. After having taken up the volatile substances in column K, the vapors pass, for the purpose of additional concentration, to the concentrating rectification column N in the form shown as placed above said column K. The readily boiling vapors pass from column N through the pipe 11 to the heating coil M of the evaporator W which is to be heated, and are liquefied therein and partly returned as reflux liquid to column N through the pipe 14 and partly removed as a readily boiling product through the outlet controlled by the regulating member 12.

Figure 8 illustrates a modification of the embodiment shown in Figure 6 and wherein there is secured a greater concentration of the vapors enriched by volatile substances at a pressure lower than that obtaining in column K.

The vapors coming from the driving-off rectification column K operating under a pressure below 5 atmospheres are passed at reduced pressure through the throttle member 15 to the concentrating rectification column O operating at a pressure less than 1 atmosphere, and leave at 16 in the form of vapor after having been further enriched by volatile substances. The reflux liquid for the column O is produced by the cooling coil P from readily boiling vapors. When discharged at the lower end of the column O, the reflux liquid still contains small quantities of volatile substances. These may be driven off in a driving-off rectification column Q (also called low-wine column) arranged below the column O, whereupon the reflux liquid freed from volatile substances leaves at 17. The rectification vapors required for column Q are produced by means of heating the discharge by the coil R and then concentrated with the vapors entering at 15. The vapors free of sulphurous acid and arising when pressure is reduced in the valve 1 are passed from the separating chamber A through the pipe 3 to a throttle member 18 with which a constant pressure is maintained in the separator A, if necessary by means of an automatic regulation arrangement. From the throttle member, the vapors are passed on for any desired heating purpose.

The special arrangements shown in the various figures are not restricted thereto, any desired combinations of the embodiments represented being possible. Thus, the concentrating rectification columns for the vapors to be enriched still more by readily boiling substances may be combined with the apparatus to be heated and mounted separately from the apparatus shown. The separator A may be eliminated entirely if desired, and the liquid brought to a reduced pressure in the throttle member 1 and the vapors produced during the reduction of the pressure may be introduced directly into the concentration column B or the driving-off column E. Any other desired devices may be introduced into the apparatus for the purpose of cooling, heating, washing, extracting, absorbing, or for other treatments. In order to insure the regular feeding of the separating apparatus there may be arranged before the latter suitable storing places for vapors or liquid, or also for vapors and liquid from which the additional apparatus is fed. These are merely some examples of the possible embodiments of the new process and its introduction into other processes.

Since it is obvious that various changes and modifications may be made in the above description without departing from the nature or spirit thereof, this invention is not restricted thereto except as set forth in the appended claims.

I claim:

1. A process of obtaining or separating volatile substances from hot or boiling solvents under pressure which comprises reducing the pressure on said solvent whereby a gaseous mixture containing at least some of the volatile substances is produced, separating said gaseous mixture from the remaining liquid, rectifying the gaseous mixture to concentrate the volatile substances in said gaseous mixture, condensing said gaseous mixture, each of the previously recited steps being performed at super-atmospheric pressure, and utilizing the heat resulting from the condensing step for heating purposes.

2. A process of obtaining or separating volatile substances from hot or boiling solvents under pressure which comprises reducing the presure on said solvent whereby a gaseous mixture containing at least some of the volatile substances is produced, separating said gaseous mixture from the remaining liquid, rectifying said liquid to drive off the volatile compounds in the form of a gas, condensing said gas, each of the previously recited steps being performed at super-atmospheric pressure, and utilizing the heat resulting from the condensing step for heating purposes.

3. A process of obtaining or separating volatile substances from hot or boiling solvents under pressure which comprises reducing the pressure on said solvent whereby a gaseous mixture containing at least some of the volatile substances is produced, separating said gaseous mixture from the remaining liquid, rectifying said liquid to drive off the volatile compounds in the form of a gas which mingles with said gaseous mixture, rectifying the resulting gaseous mixture to concentrate the volatile substances therein, condensing said gaseous mixture, each of the previously recited steps being performed at super-atmospheric pressure, and utilizing the heat resulting from the condensing step for heating purposes.

4. A process of obtaining or separating volatile substances from hot or boiling solvents under pressure which comprises reducing the pressure on said solvent whereby a gaseous mixture containing at least some of the volatile substances is produced, separating said gaseous mixture from the remaining liquid, rectifying the gaseous mixture to concentrate the volatile substances in said gaseous mixture, refluxing the gaseous mixture with a condensate thereof, condensing said gaseous mixture, each of the previously recited steps being performed at super-atmospheric pressure, and utilizing the heat resulting from the condensing step for heating purposes.

5. A process of obtaining or separating volatile substances from hot or boiling solvents under pressure which comprises reducing the pressure on said solvent whereby a gaseous mixture containing at least some of the volatile substances is produced, separating said gaseous mixture from the remaining liquid, rectifying said liquid to drive off the volatile compounds in the form of a gas which mingles with said gaseous mixture, rectifying the resulting gaseous mixture to concentrate the volatile substances therein, refluxing the gaseous mixture with a condensate thereof, condensing said gaseous mixture, each of the previously recited steps being performed at super-atmospheric pressure, and utilizing the heat resulting from the condensing step for heating purposes.

6. A process for obtaining or separating volatile substances from hot or boiling solvents under pressure which comprises reducing the pressure on said solvent whereby a gaseous mixture is produced, driving off the volatile compounds from the remaining liquid, utilizing the heat of the gaseous mixture containing the volatile compounds for heating purposes, reducing the pressure on the said liquid whereby a second gaseous mixture is produced, and utilizing the heat of said second gaseous mixture for heating purposes.

7. A process for obtaining or separating volatile substances from hot or boiling solvents under pressure which comprises reducing the pressure on said solvent whereby a gaseous mixture is produced, driving off the volatile compounds from the remaining liquid, rectifying the gaseous mixture containing the volatile compounds, utilizing the heat of the gaseous mixture containing the volatile compounds for heating purposes, reducing the pressure on the said liquid whereby a second gaseous mixture is produced, and utilizing the heat of said second gaseous mixture for heating purposes.

8. A process of obtaining or separating volatile substances from hot or boiling solvents under pressure which comprises rectifying said solvents under pressure whereby vapors of volatile substances are produced, condensing said volatile substances, utilizing the heat resulting from the condensing step for heat purposes, reducing the pressure on the liquid remaining from said rectification, separating the vapors of the volatile substances and the liquid resulting from the pressure reduction step, condensing the vapors obtained in said separation step, each of the previously recited steps being performed at super-atmospheric pressure, and utilizing the heat resulting from said condensing step for heating purposes.

9. A process of obtaining or separating volatile substances from hot or boiling solvents under pressure which comprises rectifying said solvents under pressure whereby vapors of volatile substances are produced, enriching said vapor of the volatile substances, condensing said enriched vapors of the volatile substances, utilizing the heat resulting from the condensing step for heat purposes, reducing the pressure on the liquid remaining from said rectification, separating the vapors of the volatile substances and the liquid resulting from the pressure reduction step, condensing the vapors obtained in said separation step, each of the previously recited steps being performed at super-atmospheric pressure, and utilizing the heat resulting from said condensing step for heating purposes.

10. A process of obtaining or separating volatile substances from hot or boiling solvents under pressure which comprises rectifying said solvents under pressure whereby vapors of volatile substances are produced, enriching said vapor of the volatile substances, condensing said enriched vapors of the volatile substances, utilizing the heat resulting from the condensing step for heat purposes, utilizing a portion of the condensed vapor as a reflex liquid for the enriched vapors, reducing the pressure on the liquid remaining from said rectification, separating the vapors of the volatile substances and the liquid resulting from the pressure reduction step, condensing the vapors obtained in said separation step, each of the previously recited steps being performed at super-atmospheric pressure, and utilizing the heat resulting from said condensing step for heating purposes.

11. A process of separating volatile substances from hot or boiling solvents under pressure which comprises rectifying said solvents under pressure whereby vapors of the volatile substances are separated from the liquid, reducing the pressure of the said vapors of the volatile substances, rectifying said vapors, condensing said rectified vapors, reducing the pressure on the liquid remaining from the rectification of the original solvent, separating the liquid and vapors resulting from the reduction in pressure of the liquid remaining after the rectification of the original solvent, condensing the last-named vapors, each of the previously recited steps being performed at super-atmospheric pressure, and utilizing the heat resulting therefrom for heating purposes.

12. A process of separating volatile substances from hot or boiling solvents under pressure which comprises rectifying said solvents under pressure whereby vapors of the volatile substances are separated from the liquid, reducing the pressure of the said vapors of the volatile substances, rectifying said vapors while being treated with a reflux liquid, condensing said rectified vapors, reducing the pressure on the liquid remaining from the rectification of the original solvent, separating the liquid and vapors resulting from the reduction in pressure of the liquid remaining after the rectification of the original solvent, condensing the last-named vapors, each of the previously recited steps being performed at super-atmospheric pressure, and utilizing the heat resulting therefrom for heating purposes.

MAX SEIDEL.